July 5, 1938.   R. C. ANDERSON   2,123,090
SIGNAL
Filed Nov. 17, 1936   2 Sheets—Sheet 1
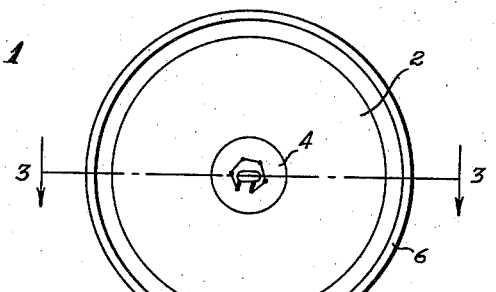
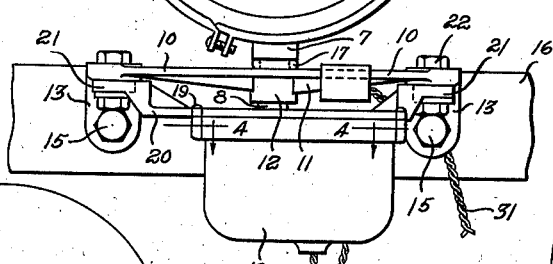
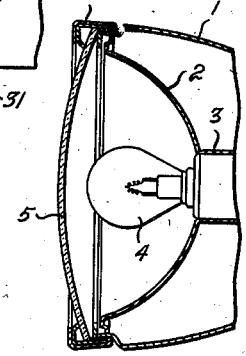
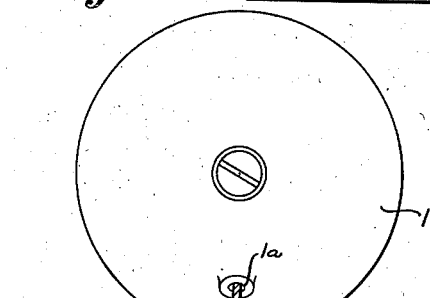
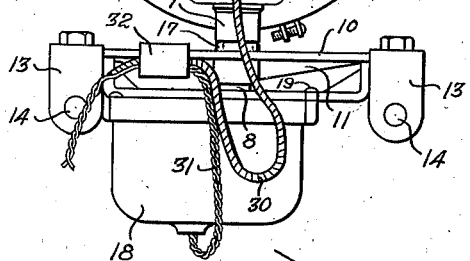
INVENTOR
ROBERT C. ANDERSON
BY
ATTORNEYS July 5, 1938.  R. C. ANDERSON  2,123,090
SIGNAL
Filed Nov. 17, 1936   2 Sheets-Sheet 2
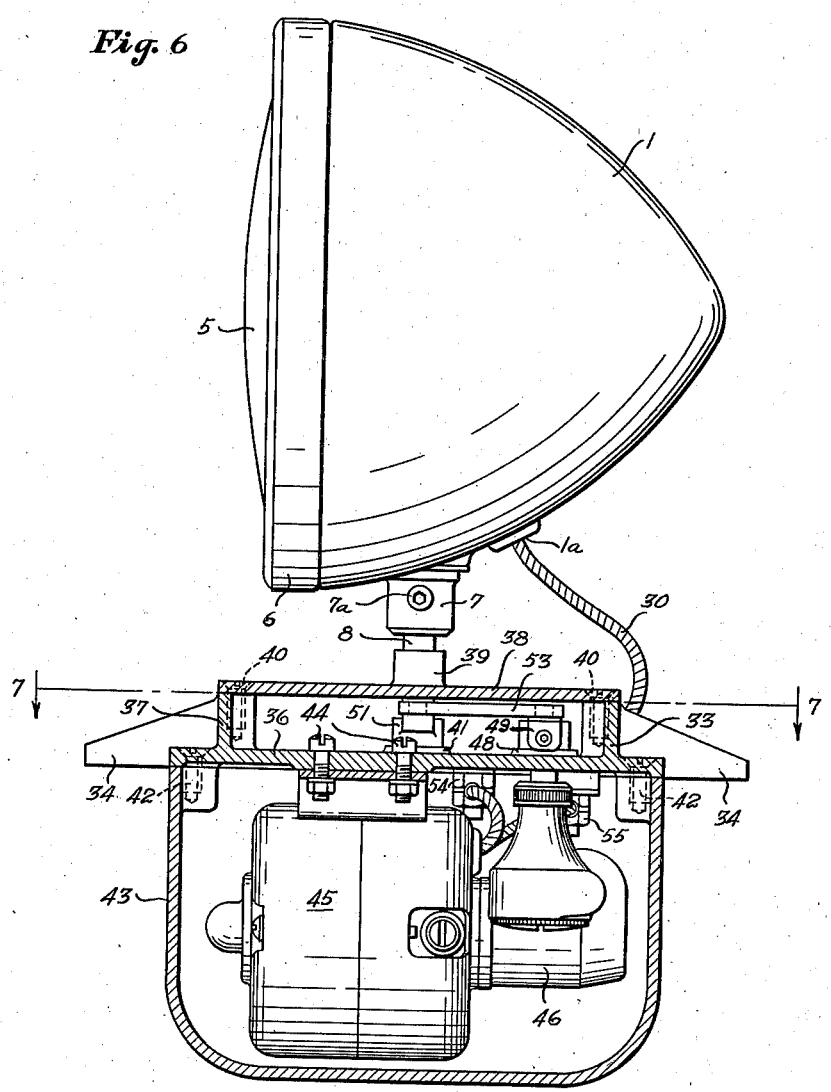
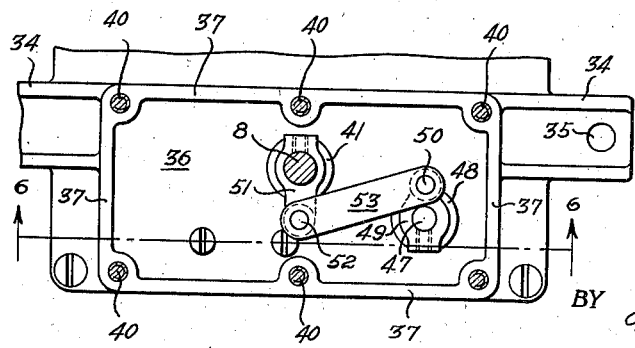
INVENTOR
ROBERT C. ANDERSON
BY 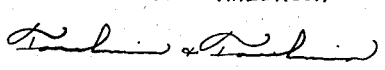
ATTORNEYS

Patented July 5, 1938

2,123,090

UNITED STATES PATENT OFFICE 2,123,090

SIGNAL

Robert C. Anderson, Dayton, Ohio, assignor to Buckeye Iron & Brass Works, Dayton, Ohio, a corporation of Ohio Application November 17, 1936, Serial No. 111,271

5 Claims. (Cl. 240—48)

This invention relates to signals and, in particular, to signals for emergency vehicles such as fire apparatus, police vehicles, ambulances and the like.

It is an object of this invention to provide an illuminating mechanism for applying a concentrated beam of colored light to the ground in front of a moving vehicle, to which it is attached, in such manner that the beam will sweep back and forth with a regular oscillatory motion across the highway and road or street intersection to indicate, by the moving beam, that a privileged, emergency vehicle is approaching. The vehicle is thus distinguished from other vehicles and the lights thereof are distinguished from the lights of other vehicles using the roadway.

It has, heretofore, been customary to employ complicated systems of multiple lights indicating various types of signals in order to provide warning for the approach of an emergency vehicle. While these former types of apparatus were found satisfactory for heavy and expensive vehicles, upon which substantial expenditures might be made for providing such apparatus, these types of apparatus were totally unsatisfactory for use with small, light, fast emergency vehicles, because of their great expense and also because of the weight and complication of the mechanism thereof.

It is, therefore, an object of this invention to provide, for use on a small vehicle, a single mechanism which may be placed in an inconspicuous location on the vehicle, as well as on a large vehicle, which will direct the attention of traffic to the approach of the emergency vehicle, but which will not involve the use of a complicated arrangement of lights, signals and electrical apparatus.

It is a further object of this invention to provide such signalling apparatus which will be inexpensive to operate and which will be easy to attach to a vehicle of conventional type and which will require but little current of low voltage for the operation thereof.

It is a further object of this invention to provide such a device wherein the operative parts are confined within a small space whereby the device may be mounted close to the ground on a motorcycle, small motor car or small fire engine.

It is a further object of this invention to provide, in such an apparatus, means for supporting the operative parts thereof in such manner as to protect them from the elements, to provide for the operation thereof without vibration and to provide for ease of acccess thereto for the purpose of lubrication and/or repair.

It is a further object to provide, in such a mechanism, separate housing means for the electric motor and gear reducing means and for the linkage means which is adapted to translate rotary movement into oscillation of the lamp support in a predetermined arc.

It is a further object to provide in such a housing means a frame member of integral construction having therein a chamber adapted for support of the linkage means, which frame member is adapted to provide a cover for the housing means for the drive motor and gear reduction means, and which frame member is provided with outwardly extending arms adapted to have bracket means attached thereto.

It is a further object of this invention to provide such a frame member which is provided with a cover plate having integrally formed therewith a bearing adapted to support the oscillating lamp support.

These and other objects and advantages will appear from the following description taken in connection with the drawings.

This application is a continuation in part of my application Serial No. 33,861, filed July 30, 1935.

In the drawings:

Figure 1 is a front elevational view of the apparatus of this invention, mounted upon a cross bar extending between the head lights of an automobile in front of the radiator thereof;

Figure 2 is a rear elevational view thereof;

Figure 3 is a sectional view taken on the line 3—3 of Figure 1;

Figure 4 is a sectional view taken on the line 4—4 of Figure 1;

Figure 5 is a diagrammatic view, in plan, of the moving lamp, showing, in broken lines, the extreme positions of oscillation of the lamp;

Figure 6 is an elevational view, partly in section, showing a modified form of lamp oscillating means; and Figure 7 is a plan view of the structure shown in Figure 6, showing the lamp support in section, as taken along the line 7—7 of Figure 6.

Referring to the drawings in detail, and as shown particularly in Figures 1, 2 and 3, the lamp comprises a casing 1, in which is suitably supported a reflector 2 having a lamp base 3 in order to support the lamp bulb 4. A suitable lens 5, which is preferably colored, is supported by means of the flange 6 to the casing 1 of the lamp. The casing 1 of the lamp is provided with an integral boss 7, to which is rigidly attached the lamp support 8. Suitable wiring is, of course, led through the hole 1a to the lamp base 3.

In the construction shown in Figures 1 to 4 inclusive, the lower end of the lamp support 8 is provided with a pinion 9 which is rigidly secured thereto. Suitable means is provided for imparting oscillating movement to the lamp support 8 through the pinion 9. The lamp support 8 is suitably journaled in the bracket 10 which is in the form of a horizontally disposed plate having vertically downwardly extending ribs 11 and a central vertically disposed bearing boss 12.

Integrally formed bracket arms 13 extend rearwardly and downwardly from the ends of the bracket 10 and the downwardly directed ear portions thereof are provided with bores 14 which are adapted to receive bolts 15 for attachment to the tie rod 16 or other suitable support. A thrust washer 17 is disposed between the lower surface of the boss 7 and the upper flat surface of the bracket 10 for suitably supporting the lamp support 8 against downward thrust.

The motor casing 18 is of oblong cross section and forms a unitary casing which is secured by means of screws 19 to the top plate 20 which is in the form of a plate provided with a suitable aperture for receiving the lamp support 8. The central portion of the top plate 20 encloses the top of the motor casing 18. Extending outwardly from opposite ends of the plate portion of the top plate 20 are bracket arms 21 which are provided with suitable bores adapted to register with the bores in the lamp support 10 for the reception of bolts 22 which rigidly connect the bracket arms 21 to the bracket 10.

Due to the offset relation of the bracket arms 21, the plate portion of the top plate 20 is disposed in spaced relation with respect to the bracket 10. The pinion 9 of the lamp support 8 is disposed within the motor casing 18 below the plate portion of the top plate 20. Likewise, mounted in the motor casing 18 is the motor 23 which has its rotor shaft 24 provided with a rotor pinion 25. Also supported in the motor casing 18, in mesh with the rotor pinion 25 and in a plane disposed below the pinion 9 is a gear 26. The sector gear 27 is pivotally supported in the plane of the pinion 9 by means of the stud 22'. The sector gear 27 is operatively connected to the gear 26 by means of the pitman 28 which is pivotally attached at one end to a point on the gear 26 spaced from the center thereof and pivotally attached at the other end to the sector gear 27 at a point spaced from the axis thereof.

Rotation of the rotor shaft 24 of the motor 23 causes the rotor pinion 25 to rotate the gear 26, and the connection of the gear 26 with the sector gear 27 causes the sector gear to be oscillated during rotation of the gear 26. Oscillation of the sector gear 27 is translated through the pinion 9 to oscillation of the lamp support 8. Therefore, when the motor 23 is caused to rotate, the lamp casing 1 oscillates in a predetermined arc. The lamp wire is designated 30 and the motor wires are designated 31. These wires are adapted to be suitably attached to the source of electrical power of the vehicle, and, in order that sufficient slack be provided for accommodating the oscillation of the lamp casing 1, a clamp member 32 is provided for supporting portions of the wires 30 and 31 upon the bracket 10.

Suitable switches may be provided for connecting and disconnecting the lamp and motor to the power source, either simultaneously or separately.

The bracket 10, due to the provision of the longitudinal downwardly disposed rib 11, provides an extremely rigid bearing surface in the bearing boss 12 thereof, whereby the lamp support 8 may be oscillated substantially without vibration. The bracket 10 also cooperates with the thrust washer 17 to provide means for supporting the lamp casing 1 through the boss 7 thereof against downward thrust. The top plate 20 provides means for enclosing the motor casing 18 as well as means for supporting this motor casing 18 in spaced relation with respect to the bracket 10. The bracket arms 21 are joined to the plate portion of the top plate 20 by longitudinally extending strengthening ribs which are oppositely disposed and substantially in alignment with the ribs 11 of the bracket 10.

When it is desired to have access to the operating parts for the lamp, the screws 19 may be removed whereby the motor casing 18 and supported parts may be moved downwardly away from the top plate 20. The lamp support 8 and pinion 9 will remain supported, while the sector gear 27, the gear 26, the motor 23 and its rotor pinion 25 will be removed because of their support within the removable motor casing 18. As will be most clearly understood by reference to Figure 4 of the drawings, access to all of the contained parts in the motor casing 18 may then be had.

In the embodiment disclosed in Figures 6 and 7, a frame casting 33 is provided with integral oppositely extending bracket arms 34 which are adapted to be attached by means of bolts extending through the apertures 35 therein to any desired support. The casting 33 is provided with a plate portion 36 having surrounding upwardly extending walls 37. A top plate 38 is provided with a bearing boss 39 adapted to support the lamp support 8 for oscillation. The top plate 38 is secured to the supporting walls 37 by means of screws 40. The plate portion 36 of the frame casting 33 is provided with a boss 41, in which is formed thrust bearing means for receiving the lower end of the lamp support 8. Beneath the plate portion of the frame casting 33 and secured thereto by means of screws 42 is a motor casing or housing 43.

Attached to the underside of the plate portion 36 of the frame casting 33 by means of bolts 44 is the motor 45 which is provided with a gear reduction housing 46 rigidly attached to the motor 45 and having the output shaft 47 thereof extending upwardly into the linkage chamber formed by the top plate 38, the plate portion 36 and the surrounding walls 37. A boss 48 surrounds the hole in the plate portion 36, through which the output shaft 47 extends. Rotation of the motor 45 causes rotation of the output shaft 47 although, due to the reduction provided by the gearing in the gear reduction housing 46, the speed of the output shaft 47 is much slower than the speed of rotation of the rotor shaft of the motor 45.

Rigidly secured to the shaft 47 is the lever 49 which is provided with an integral pin 50 at its end. The lever 49 is adapted to cooperate with the top surface of the boss 48 to prevent axial downward movement of the output shaft 47. Rigidly secured to the lamp support 8 is a lever 51, similar to the lever 49, which lever 51 is provided with an integral pin 52. The link 53 is provided at each end with an aperture, which apertures are adapted to pivotally engage the pins 50 and 52 respectively. The pin 52 is spaced a greater distance from the axis of the lamp support 8 than is the pin 50 spaced from the axis of the output shaft 47. By means of this difference in the effective lengths of arms of levers 49 and 51, full rotation of the output shaft 47 causes oscillation of the lamp support 8.

The frame casting 33 is provided with suitably insulated terminal posts 54 and 55 respectively, to which the power leads of the motor 45 are attached.

The frame casting 33 cooperates with the top plate 38 to form a linkage chamber, as described above. The boss 41 of the frame casting 33 and the boss 39 of the top plate 38 cooperate to support the lamp support 8 for oscillation and against axial thrust. The frame casting 33 also provides a support for the motor 45. The bracket arms 34 of the frame casting 33 provide means of attachment to any desired bracket means or other support. The frame casting 33 cooperates with the motor casing or housing 43 to form a chamber for the motor 45 and gear reduction housing 46 which is separate from the linkage chamber formed by the frame casting 33 and the top plate 38. The boss 7 of the lamp casing 1 is secured rigidly to the lamp support 8 by means of the locking stud 7a.

When access to the motor or gear reduction is desired, it is merely necessary that the screws 42 be removed whereby the motor casing or housing 43 may be separated from the frame casting 33 to fully expose the motor 45 and its attached gear reduction. When the motor casing or housing 43 is removed from the frame casting 33, the respective lubricating plugs of the motor 45 and the gear reduction housing 46 may be removed whereby to suitably lubricate the motor and the gears in the gear housing.

Due to the fact that it is preferred to use grease in the gear reduction housing, and light motor oil in the electric motor, suitable lubricant seal means is provided between the gear reduction housing and the motor 45 whereby to prevent displacement of grease from the gear reduction housing to the housing of the motor 45, or from the motor 45 to the gear reduction housing 46. The removal of the motor casing or housing 43 from the frame casting 33 is accomplished without, in any way, disturbing or exposing the linkage contained in the linkage chamber of the frame casting 33.

If access to the linkage chamber is desired, the boss 7 of the lamp casing 1 may be removed from the lamp support 8 by releasing the locking stud 7a. The lamp casing 1 may then be removed from the lamp support 8. After the removal of the lamp casing 1 from the lamp support 8, the top plate 38 may be removed from the frame casting 33 by removal of the screws 40 which secure the top plate to the frame casting 33. After the removal of the screws 40 has been accomplished, the top plate 38 may be slid upwardly over the lamp support 8 and removed therefrom. The link 53 may then be lifted upwardly from the pins 50 and 52, and after this has been accomplished, the lamp support 8 and rigidly attached lever 51 may be bodily removed from the thrust bearing formed in the boss 41. The lever 49 may be removed from the output shaft 47 of the gear reduction; and after this removal has occurred, by unscrewing the bolts 44 (after the motor casing or housing 43 has been removed from the frame casting 33), the motor 45 may be separated from the frame casting 33, whereby to be entirely removed therefrom. The process of assembly is the reverse of the above described process of disassembly.

The binding posts 54 and 55 for the electric motor 45 will be suitably electrically connected to the source of power for the vehicle to which the device is attained. The lamp wire 30 will also be suitably attached to the vehicle source of power and any desired arrangement of switch device may be used. For instance, a single switch may be used for controlling the circuits of the lamp and the motor, or separate switches may be utilized in order that the lamp bulb 4 may be energized independently of operation of the oscillating mechanism through the motor 45.

It will thus be seen that I have produced a structure by means of which an extremely small high speed motor may be used for oscillating a lamp of substantial size. Likewise, I have produced a structure wherein, by the use of a single frame casting, a cup-like motor casing, and a top plate, all of simple construction, I have produced a combined frame and housing wherein separate chambers are provided for housing the lamp oscillating linkage and the drive motor and gear reduction, these separate means being separated from one another, and access being readily had to one of these means without, in any way, disturbing the adjustment of the other.

It will likewise be seen that the frame casting, in addition to cooperating with the top plate and the motor casing to form two separate chambers, also provides thrust bearing means for supporting the weight of the lamp casing and associated parts which are attached to the lamp support 8, and that the frame casting 33 likewise provides a supporting frame for the motor 45 and the rigidly attached gear reduction housing 46, as well as a bearing for the output shaft 47 of the gear reduction. Besides this, the frame casting, by means of its oppositely extending bracket arms 34, provides means of easy attachment for any desired brackets or other means by which the frame casting 33 may be rigidly attached to the tie rod extending between the lamps of a vehicle and in front of the radiator thereof, or the handle bar of a motorcycle or any other suitable vehicle. As the motor 45 is extremely small and economical, the signal mechanism of my invention may be attached or applied to vehicles which are equipped with no source of power and the power may be supplied by the use of conventional dry cell units.

It will be understood that the above described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In signal means including an oscillatable lamp support, a motor, gear reducing means and means attached to said gear reducing means and said lamp support for translating rotary movement of said motor into oscillating movement, said lamp support comprising a single plate carrying all of said parts, means for mounting said motor and gear reducing means directly on one side of said plate, a cover attached directly to said plate for said motor and providing a motor enclosing chamber, said means for translating rotary movement into oscillating movement comprising linkage means, a shaft extending through said plate and connecting said linkage means with said gear reducing means, pivots for said linkage means and said oscillatable lamp support mounted directly on the other side of said plate, and a detachable cover mounted on said plate and forming with said plate a linkage chamber, whereby ready access may be obtained to said linkage chamber without disturbing the arrangements of parts in said motor chamber, and bearing means on said cover for said oscillatable lamp support.

2. In signal means including an oscillatable lamp support having a lamp supported thereon, a frame casting comprising a single supporting plate, linkage means mounted on one side of said plate, a motor and reduction gearing mechanism mounted directly on the other side of said plate, a casing for said motor attached directly to said plate and forming a motor casing, a top plate removably attached directly to the opposite side of said plate, whereby access may be had to said linkage means, and adapted to cooperate therewith to form a linkage chamber, bearing means in said top plate for said lamp support, a shaft extending through said supporting plate and connected to said linkage on one side thereof, and to said reduction gearing on the opposite side thereof, a plurality of bosses mounted on said supporting plate and adapted to support said linkage means, and form a bearing for said lamp support, said linkage chamber being constructed and adapted to entirely enclose said linkage and said lamp support.

3. In signal means including an oscillatable lamp support having a lamp supported thereon, a frame casting comprising a single flat supporting plate, having flanges, linkage means mounted on one side of said plate, a motor and reduction gearing mechanism mounted directly on the other side of said plate, a casing for said motor attached directly to said plate and forming a motor casing, a top plate removably attached directly to said flanges, whereby access may be had to said linkage means, and adapted to cooperate therewith to form a linkage chamber, bearing means in said top plate for said lamp support, a shaft extending through said supporting plate and connected to said linkage means on one side thereof, and to said reduction gearing on the opposite side thereof, a plurality of bosses mounted on said supporting plate and adapted to support said linkage means, and form a bearing for said lamp support, said linkage chamber being constructed and adapted to entirely enclose said linkage and said lamp support.

4. In a signal device including a lamp and an oscillatable support therefor, supporting means comprising a single flat plate, a motor attached directly to the underside of said plate, a casing attached directly to said plate and enclosing said motor, drive means extending from said motor through an aperture in said plate to the opposite side thereof, linkage means mounted on bearings affixed directly to the opposite side of said plate and adapted to be driven by said drive means, a cover detachably mounted on said plate and forming therewith a housing for said linkage means, an aperture in said cover forming a bearing for said lamp support, and an arm on said lamp support and forming part of said linkage means.

5. In signal means including an oscillatable lamp support having a lamp supported thereon, a frame casting comprising a horizontal flat plate, a motor mounted directly to the under side of said flat plate, speed reducing gearing connected to said motor, a shaft driven by said speed reducing gearing and extending through an aperture in said plate, a casing member surrounding said motor and attached to said plate to form an enclosure for said motor and speed reducing gearing, a cover member mounted on the opposite side of said plate, detachably therefrom and forming therewith a linkage chamber whereby access may be had to the interior of said linkage chamber without obtaining access to said motor and speed reducing gearing, linkage means in said chamber comprising an arm connected to said lamp support, a second arm connected to said shaft, means pivotally connecting said arms to each other, whereby rotary movement of said shaft will be translated into oscillatable movement of said lamp support, and bearing supports for said lamp support, arms and linkage means mounted directly on the upper side of said plate.

ROBERT C. ANDERSON.